United States Patent [19]

Markusch

[11] 4,408,008
[45] Oct. 4, 1983

[54] STABLE, COLLOIDAL, AQUEOUS DISPERSIONS OF CROSS-LINKED UREA-URETHANE POLYMERS AND THEIR METHOD OF PRODUCTION

[75] Inventor: Peter Markusch, McMurray, Pa.

[73] Assignee: Mobay Chemical Corporation, Pittsburgh, Pa.

[21] Appl. No.: 286,493

[22] Filed: Jul. 24, 1981

[51] Int. Cl.³ .................... C08L 75/10; C08L 75/02
[52] U.S. Cl. .................... 524/591; 156/331.7; 428/423.1; 428/425.6; 428/425.8; 524/507; 528/67; 528/68; 528/69; 528/71
[58] Field of Search .................. 260/29.2 TN; 528/67, 528/68, 69, 71; 524/591; 428/423.1; 156/331.7

[56] References Cited

U.S. PATENT DOCUMENTS

| | | | |
|---|---|---|---|
| 2,968,575 | 1/1961 | Mallonee | 106/287 |
| 3,479,310 | 11/1969 | Dieterich et al. | 260/29.2 |
| 3,870,684 | 3/1975 | Witt et al. | 260/75 |
| 3,905,929 | 9/1975 | Noll | 260/29.2 |
| 3,920,598 | 11/1975 | Reiff et al. | 260/29.2 |
| 3,935,146 | 1/1976 | Noll et al. | 260/29.2 TN |
| 3,940,542 | 2/1976 | Knopf et al. | 528/904 |
| 3,951,897 | 4/1976 | Matsuda et al. | 260/29.2 TN |
| 4,066,591 | 1/1978 | Scriven et al. | 260/29.2 |
| 4,092,286 | 5/1978 | Noll et al. | 260/29.2 |
| 4,190,566 | 2/1980 | Noll et al. | 260/29.2 |
| 4,203,883 | 5/1980 | Hangauer, Jr. | 260/29.2 |
| 4,237,264 | 12/1980 | Noll et al. | 528/67 |
| 4,238,378 | 12/1980 | Markusch et al. | 260/29.2 |
| 4,269,748 | 5/1981 | Nachtkamp et al. | 260/29.2 TN |
| 4,292,226 | 9/1981 | Wenzel et al. | 260/29.2 TN |
| 4,293,474 | 10/1981 | Dieterich et al. | 260/29.2 TN |
| 4,293,679 | 10/1981 | Cogliano | 260/29.2 TN |
| 4,303,774 | 12/1981 | Nachtkamp et al. | 528/71 |

FOREIGN PATENT DOCUMENTS 347  1/1979  European Pat. Off. .
1143309  2/1969  United Kingdom .

Primary Examiner—Theodore E. Pertilla
Attorney, Agent, or Firm—Gene Harsh; Lawrence S. Pope; Thomas W. Roy

[57] ABSTRACT

The present invention relates to a process for the preparation of stable, colloidal, aqueous dispersions of cross-linked urea-urethanes which comprises reacting (a) an aqueously dispersed, substantially linear, isocyanate-terminated prepolymer having a molecular weight of up to about 25,000 and containing
  (i) about 0 to 120 milliequivalents of ionic groups per 100 grams of prepolymer, and
  (ii) about 0.35 to 10% by weight, based on the weight of the prepolymer, of lateral and/or terminal, hydrophilic ethylene oxide units wherein components (i) and (ii) are present in an amount sufficient to provide a stable dispersion of the prepolymer in the aqueous medium, with
(b) polyfunctional amine chain extenders having an average functionality between about 2.2 and 6.0.

The present invention additionally relates to the aqueous dispersions produced by the above process and to the films, coatings or adhesives produced from these dispersions.

69 Claims, No Drawings

STABLE, COLLOIDAL, AQUEOUS DISPERSIONS OF CROSS-LINKED UREA-URETHANE POLYMERS AND THEIR METHOD OF PRODUCTION

BACKGROUND OF THE INVENTION

1. Field of the Invention

The present invention is directed to stable, colloidal, aqueous dispersions of cross-linked urea-urethane polymers and their method of production.

2. Description of the Prior Art

Urea-urethanes are used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings.

Conventionally, coatings of urea-urethanes have been formed from solutions of the urea-urethanes in organic solvents. As the coating cures, the solvents evaporate into the atmosphere. This is economically disadvantageous due to the high costs of these solvents, but more importantly, these solvents also cause pollution of the atmosphere.

Accordingly, many efforts have been directed to forming urea-urethane coatings from dispersions of these polymers in water. Economically, the use of water is very advantageous and, in addition, water does not pollute the atmosphere as it evaporates from the coating. However, urea-urethanes are not compatible with water, i.e., they do not form stable dispersions in water, unless special processes and/or specific ingredients are used in their manufacture.

Early methods of forming stable dispersions of urea-urethanes used external emulsifiers to disperse and stabilize these polymers in water. Note U.S. Pat. No. 2,968,575 to Mallonee. While the use of these emulsifiers made it possible to produce stable dispersions, coatings produced therefrom had many disadvantages, including sensitivity to water, due to the presence of these emulsifiers.

Continued efforts led to the use of emulsifiers which were chemically incorporated into the backbone of the urea-urethane polymers. Incorporated ionic emulsifiers were disclosed in U.S. Pat. No. 3,479,310 to Dieterich et al. The use of nonionic emulsifiers chemically attached to the backbone of the polymer, is disclosed in U.S. Pat. Nos. 3,905,929, 3,920,598 and 4,190,566 to Noll, Reiff et al and Noll et al, respectively. Further improvements in the properties of coatings prepared from urea-urethane polymers were obtained by combining both ionic groups and nonionic groups into the polymer backbone. Note U.S. Pat. Nos. 4,092,286 and 4,237,264 to Noll et al and U.S. Pat. No. 4,238,378 to Markusch et al.

U.S. Pat. No. 4,066,591 to Scriven et al is directed to the production of urea-urethanes by forming isocyanate-terminated prepolymers, dispersing them in water and subsequently chain extending the prepolymers with diamines. The final product is an aqueous dispersion of a substantially linear polymer due to the fact that the functionality of the prepolymer components and the chain extender is maintained at essentially two to avoid the production of gelled or cross-linked particles in the dispersion. The products are soluble in organic solvents such as N-methyl-2-pyrrolidinone or dimethyl formamide.

The previously mentioned patents are directed to the formation of linear polyurethanes or urea-urethanes. While these products are sufficient for a number of uses, coatings derived from linear polyurethanes do not possess good resistance to organic solvents. U.S. Pat. No. 4,203,883 to Hangauer, Jr. discloses that the solvent resistance, among other properties, may be improved by using polyfunctional amines as chain extenders in order to produce cross-linked urea-urethanes. U.S. Pat. No. 3,870,684 to Witt et al and equivalent British Pat. No. 1,143,309 also disclose the use of polyfunctional amines for producing cross-linked urea-urethanes. However, both Hangauer, Jr. and Witt et al exclusively use ionic groups to ensure to the dispersibility of the urea-urethane in water. As a result, the aqueous polyurethanes obtainable are unstable to changes in pH or towards the addition of salt group-containing additives which are useful in coatings or adhesive formulations. Examples include the addition of alkoxysilanes requiring specific pH values, the addition of melamine-formaldehyde adducts together with organic sulfonic acids or sulfonic acid salts, and the addition of polyvalent cations to provide cross-linking. Hangauer, Jr. also recommends against the use of excessive amounts of ether groups since they cause the resulting polymers to swell in water.

It is an object of the present invention to provide aqueous dispersion of urea-urethanes which possess an improved ability to coalesce to films or coatings.

It is a further object of the present invention to provide aqueous dispersions which are stable over a wide range of temperature and pH conditions.

It is an additional object of the present invention to provide aqueous dispersions of urea-urethanes which remain stable in the presence of electrolytes.

It is also an object of the present invention to react isocyanate-terminated prepolymers with polyfunctional amine chain extenders in a manner which produces stable, colloidal aqueous dispersions.

It is a final object of the present invention to use aqueous dispersions of urea-urethanes to produce coatings or films which possess a wide range of properties including hydrolysis resistance, solvent resistance, hardness, elasticity, flexibility, tear resistance, tensile strength and resistance to yellowing.

These objects may be achieved according to the present invention by reacting aqueous dispersions of substantially linear, isocyanate-terminated prepolymers containing nonionic and optionally, ionic, chemically incorporated, hydrophilic emulsifiers with polyfunctional amine chain extenders to produce cross-linked urea-urethane particles which are colloidal in size and remain stably dispersed in water.

SUMMARY OF THE INVENTION

The present invention relates to a process for the preparation of stable, colloidal, aqueous dispersions of cross-linked urea-urethanes which comprises reacting (a) an aqueously dispersed, substantially linear, isocyanate-terminated prepolymer having a molecular weight of up to about 25,000 and containing
 (i) about 0 to 120 milliequivalents of ionic groups per 100 grams of prepolymer, and
 (ii) about 0.35 to 10% by weight, based on the weight of the prepolymer, of lateral and/or terminal, hydrophilic ethylene oxide units wherein components (i) and (ii) are present in an amount sufficient to provide a stable dispersion of the prepolymer in the aqueous medium, with (b) polyfunctional amine chain extenders having an average functionality between about 2.2 and 6.0.

The present invention additionally relates to the aqueous dispersions produced by the above process and to the films, coatings or adhesives produced from these dispersions.

DETAILED DESCRIPTION OF THE INVENTION

The isocyanate-terminated prepolymers of the present invention are prepared from (a) organic polyisocyanates which contain at least two aliphatically or cycloaliphatically bound isocyanate groups, (b) organic compounds which have at least two isocyanate-reactive groups, (c) organic compounds which are monofunctional or difunctional in the context of the isocyanate-polyaddition reaction and which contain hydrophilic ethylene oxide units and, optionally, (d) organic compounds which are monofunctional or difunctional in the context of the isocyanate-polyaddition reaction and which contain ionic groups or potential ionic groups.

Examples of suitable polyisocyanate components (a) to be used in preparing the isocyanate-terminated prepolymers in accordance with the present invention are organic diisocyanates represented by the general formula $$R(NCO)_2$$

in which R represents an organic group, obtainable by removal of the isocyanate groups from an organic diisocyanate having a molecular weight of from about 112 to 1,000, and preferably from about 140 to 400. Diisocyanates preferred for the process according to the invention are those represented by the general formula indicated above, in which R represents a divalent aliphatic hydrocarbon group having from 4 to 18 carbon atoms, a divalent cycloaliphatic hydrocarbon group having from 5 to 15 carbon atoms, or an araliphatic hydrocarbon group having from 7 to 15 carbon atoms. Examples of the organic diisocyanates which are particularly suitable for the process include tetramethylene diisocyanate; hexamethylene diisocyanate; dodecamethylene diisocyanate; cyclohexane-1,3- and -1,4-diisocyanate; 1-isocyanato-3-isocyanatomethyl-3,5,5-trimethylcyclohexane; bis-(4-isocyanatocyclohexyl)methane; 1,3- and 1,4-bis(isocyanatomethyl)cyclohexane; and bis-(4-isocyanato-3-methyl-cyclohexyl)-methane. Mixtures of diisocyanates can, of course, be used.

The organic compounds (b) containing at least two isocyanate-reactive groups can be divided into two groups, i.e., high molecular weight compounds with molecular weights from about 300 to 6,000, preferably from about 300 to 3,000, and low molecular weight compounds with molecular weights below about 300. Examples of the high molecular weight compounds are:

(1) dihydroxy polyesters generally known in polyurethane chemistry, which are obtained from dicarboxylic acids (such as succinic acid, adipic acid, suberic acid, azelaic acid, sebacic acid, phthalic acid, isophthalic acid, terephthalic acid, tetrahydrophthalic acid and the like) and diols (such as ethylene glycol, propylene glycol-(1,2), propylene glycol-(1,3), diethylene glycol, butanediol-(1,4), butanediol-(1,3), hexanediol-(1,6), octanediol-(1,8), neopentyl glycol, 2-methylpropanediol-(1,3), the various isomeric bis-hydroxymethyl cyclohexanes, and the like);

(2) polylactones generally known from polyurethane chemistry, e.g., polymers of ε-caprolactone started on the above-mentioned dihydric alcohols;

(3) polycarbonates generally known from polyurethane chemistry, obtainable by, for example, reaction of the above-mentioned diols with diarylcarbonates or phosgene;

(4) polyethers generally known in polyurethane chemistry; examples include the polymers or copolymers of styrene oxide, propylene oxide, tetrahydrofuran, butylene oxide or epichlorohydrin, which may be prepared with the aid of divalent starter molecules such as water, the above-mentioned diols or amines containing two NH bonds; certain proportions of ethylene oxide may also be included, provided the polyether used does not contain more than about 10% by weight of ethylene oxide; however, polyethers obtained without the addition of ethylene oxide are generally used;

(5) polythioethers, polythio mixed ethers and polythio ether esters generally known in polyurethane chemistry;

(6) polyacetals generally known in polyurethane chemistry, for example, those obtained from the above-mentioned diols and formaldehyde; and (7) difunctional polyether esters containing isocyanate-reactive end groups generally known in the art.

The compounds of the above-described type preferably used in the process according to the invention are dihydroxy polyesters, dihydroxy polylactones, dihydroxy polyethers and dihydroxy polycarbonates.

The low molecular weight compounds which may be used in the process for the preparation of the isocyanate-terminated prepolymers include, for example, the low molecular weight diols which have been described for the preparation of dihydroxy polyesters; diamines such as diaminoethane, 1,6-diaminohexane, piperazine, 2,5-dimethylpiperazine, 1-amino-3-aminomethyl-3,5,5-trimethylcyclohexane, bis-(4-aminocyclohexyl)-methane, bis-(4-amino-3-methyl-cyclohexyl)-methane, 1,4-diaminocyclohexane, 1,2-propylenediamine, hydrazine, amino acid hydrazides, hydrazides of semicarbazidocarboxylic acids, bis-hydrazides and bis-semicarbazides; and the like.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting components below about 2.1.

The reaction components which ensure the dispersibility of the polyurethanes herein include compounds containing lateral or terminal, hydrophilic ethylene oxide units (c) and compounds containing ionic group(s) or potential ionic group(s) (d). Component (c) is used in an amount sufficient to provide a content of hydrophilic ethylene oxide units of about 0.35 to 10% by weight, preferably about 0.8 to 10% by weight, more preferably about 1.0 to 6.0% by weight, and most preferably about 2.0 to 6.0% by weight, based on the weight of the prepolymer. Component (d) is used in an amount sufficient to provide an ionic group content of about 0 to 120 milliequivalents, preferably 0 to 80 milliequivalents, more preferably about 10 to 60 milliequivalents, and most preferably about 15 to 50 milliequivalents per 100 grams of prepolymer. Components (c) and (d) may be either monofunctional or difunctional in the context of the isocyanate-polyaddition reaction. Suitable compounds include:

(c) a nonionic hydrophilic component selected from
   (i) diisocyanates which contain lateral, hydrophilic ethylene oxide units,
   (ii) compounds which are difunctional in the isocyanate-polyaddition reaction and contain lateral, hydrophilic ethylene oxide units,
   (iii) monoisocyanates which contain terminal, hydrophilic ethylene oxide units,
   (iv) compounds which are monofunctional in the isocyanate-polyaddition reaction and contain terminal, hydrophilic ethylene oxide units, and
   (v) mixtures thereof; and optionally,
(d) an ionic hydrophilic component selected from
   (i) monoisocyanates or diisocyanates which contain ionic group(s) or potential ionic group(s), and
   (ii) compounds which are monofunctional or difunctional in the isocyanate-polyaddition reaction and contain ionic group(s) or potential ionic group(s).

The preferred difunctional hydrophilic components having lateral hydrophilic chains containing ethylene oxide units include compounds corresponding to the following general formula:

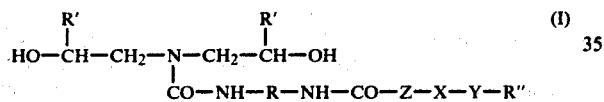

and/or compounds corresponding to the following general formula:

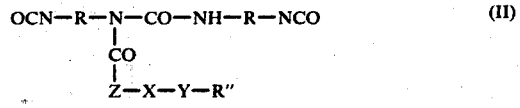

Preferred difunctional hydrophilic components (a) are those corresponding to general formula (I) above.

In general formulae (I) and (II) above,

R represents a difunctional radical of the type obtained by removing the isocyanate groups from a diisocyanate corresponding to the general formula:

of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal oxygen atom from a polyalkylene oxide chain having from about 5 to 90 chain members preferably from about 20 to 70 chain members, of which at least about 40%, preferably at least about 65%, comprises ethylene oxide units and the remainder comprises other alkylene oxides such as propylene oxide, butylene oxide or styrene oxide units, preferably propylene oxide units;

Y represents oxygen or —NR'''— wherein R''' has the same definition as R"; and

Z represents a radical which corresponds to Y, but may additionally represent —NH—.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight based on polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred hydrophilic components for incorporating lateral or terminal hydrophilic chains containing ethylene oxide units include compounds corresponding to the following general formula:

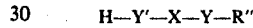

and/or compounds corresponding to the following general formula:

wherein

X, Y, Z, R and R" are as defined above; and Y' corresponds in its meaning to Y, but may additionally represent —NH—.

Monofunctional polyethers are preferably used, but preferably only in molar quantities of $\leq 10\%$, based on the polyisocyanate used, to guarantee the required high molecular weight structure of the polyurethane elastomers. In cases where relatively large molar quantities of monofunctional alkylene oxide polyethers are used, it is advantageous also to use trifunctional compounds containing isocyanate-reactive hydrogen atoms, although the average functionality of the synthesis components should preferably not exceed about 2.1 in order to obtain substantially linear prepolymers.

The monofunctional hydrophilic synthesis components are produced in accordance with the processes described in U.S. Pat. Nos. 3,905,929 and 3,920,598 by alkoxylating of a monofunctional starter, such as n-butanol or n-methyl butylamine, using ethylene oxide and optionally another alkylene oxide, for example, propylene oxide. The resultant product may be optionally further modified (although this is less preferred) by reaction with excess quantities of diisocyanates or by reaction with ammonia to form the corresponding primary aminopolyethers.

The second hydrophilic component (d) contains potential ionic group(s) or their corresponding ionic group(s). The ionic groups may be cationic or anionic, although the anionic groups are preferred. Examples of anionic groups include —COO$^\ominus$ and —SO$_3^\ominus$. Examples of cationic groups are

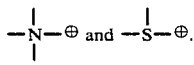

These ionic groups are formed by neutralizing the corresponding potential ionic groups either prior to, during or after forming the isocyanate-terminated prepolymer. When the potential ionic groups are neutralized prior to forming the isocyanate-terminated prepolymer, the ionic groups are incorporated directly. When neutralization is performed subsequent to forming the prepolymer, potential ionic groups are incorporated.

Suitable compounds for incorporating the previously discussed carboxylate, sulfonate and quaternary nitrogen groups are described in U.S. Pat. Nos. 3,479,310 and 4,108,814, the disclosures of which are herein incorporated by reference. Suitable compounds for incorporating tertiary sulfonium groups are described in U.S. Pat. No. 3,419,533, also incorporated by reference. The neutralizing agents for converting the potential ionic groups to ionic groups are also described in the above-mentioned U.S. patents. Within the context of this invention, the term "neutralizing agents" is meant to embrace all types of agents which are useful for converting potential ionic groups to ionic groups. Accordingly, this term also embraces quaternizing agents and alkylating agents.

The preferred ionic groups for use in the present invention are carboxylate groups and these groups may be introduced by using hydroxy-carboxylic acids of the general formula:

$$(HO)_xQ(COOH)_y$$

wherein

Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the above-mentioned formula wherein x=2 and y=1. These dihyroxy alkanoic acids are described in U.S. Pat. No. 3,412,054, herein incorporated by reference. The preferred group of dihydroxy alkanoic acids are the α,α-dimethylol alkanoic acids represented by the structural formula:

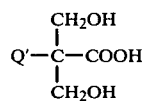

wherein Q' is hydrogen or an alkyl group containing 1 to 8 carbon atoms. The most preferred compound is α,α-dimethylol propionic acid, i.e., when Q' is methyl in the above formula.

The isocyanate-terminated prepolymers of the present invention are prepared by reacting the polyisocyanate component with the organic component containing at least 2 isocyanate-reactive groups, the component containing at least one ionic group or at least one potential ionic group and the component containing the hydrophilic ethylene oxide units. The potential ionic groups are groups which may be converted to ionic groups by treatment with neutralizing agents. The ratio of isocyanate groups to isocyanate-reactive groups is maintained between about 1.1 to 3, preferably about 1.2 to 2 and most preferably about 1.3 to 1.5 on an equivalent basis. The above components may be reacted simultaneously or sequentially to produce the isocyanate-terminated prepolymer. Simultaneous reaction will lead to the production of random copolymers, whereas a sequential-type reaction will lead to the production of block copolymers. The order of addition of the compounds containing isocyanate-reactive hydrogen(s) in the sequential-type reaction process is not critical; however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° and 130° C. The reaction is continued until the amount of unreacted isocyanate-reactive groups is essentially zero. The finished prepolymer should have a free isocyanate content of about 1 to 8%, preferably about 1 to 5% by weight, based on the weight of prepolymer solids. The molecular weight of the prepolymer should be less than about 25,000, preferably between about 600 and 12,000. It is possible to conduct the prepolymer reaction in the presence of a catalyst known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon pyrrolidones, e.g., N-methyl-2-pyrrolidinone, hydrogenated furans, aromatic hydrocarbons, and the like, and mixtures thereof. The amount of solvent employed, if any, can vary widely. The amount of solvent employed should be sufficient to provide a prepolymer solution having a sufficiently low viscosity to enhance the formation of the urea-urethane dispersion of this invention; however, the solutions may be successfully employed in forming the dispersions even though the viscosity of the solution is relatively high at the temperature of dispersion. Such viscosities may be as low as 100 centipoise or above 10,000 centipoise, e.g., at least about 12,000 or 15,000 centipoise, and only mild agitation need be employed to form the dispersion, even in the absence of an external emulsifying agent. Often about 0.01 to 10 parts by weight of solvent, preferably about 0.02 to 2 parts by weight of solvent, per part by weight based on the weight of the prepolymer can be used. However, the presence of a solvent for the prepolymer or the urea-urethane is not necessary to provide a stable, aqueous dispersion. Often, when solvent is employed during the preparation of the isocyanate-terminated prepolymer and/or the urea-urethane polymer it is desirable to remove at least a portion of the solvent from the aqueous dispersion. Advantageously, the solvent to be removed from the dispersion has a lower boiling point that water and thus can be removed from the dispersion by, for example, distillation. The removal of the low boiling solvent is desirably conducted under conditions which are not deleterious to the urea-urethane polymer such as vacuum distillation or thin film evaporation conditions. A solvent having a higher boiling point than water such as dimethyl formamide, N-methyl-2-pyrrolidinone, and the like, may be employed, in which case, the higher boiling solvent is generally retained in the aqueous dispersion of urea-urethane polymer to enhance the coalescence of the urea-urethane polymer particles during film formation.

After the prepolymer is formed it may optionally contain in addition to the hydrophilic ethylene oxide units, either ionic groups or potential ionic groups. The previously described neutralizing agents are used to convert the potential ionic groups to ionic groups. While inorganic bases or salts based on ammonia or the alkali metals may be used for producing anionic groups, these alkali metal compounds are not recommended for use as the sole neutralizing agent since they can deleteriously affect the properties of the final product, but they can be used in combination with the organic neutralizing agent provided that the amounts used are not sufficient to have a negative effect on the properties of the final product.

Suitable agents for neutralizing carboxylic acid groups are the primary, secondary or tertiary amines. Of these the trialkyl-substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with the isocyanate groups of the prepolymers which can cause gelation, the formation of insoluble particles or chain termination.

The more volatile tertiary amines are especially advantageous since the salts formed from these amines are capable of decomposing during film formation with volatilization of the tertiary amine to yield products which have increased resistance to water. Another advantage of these tertiary amines is that they do not take part in the isocyanate-polyaddition reaction. For example, when isocyanate-terminated prepolymers containing carboxylic acid groups are formed, it would be difficult to neutralize these groups prior to dispersion in water with hydroxyalkyl-containing amines or primary or secondary amines due to the fact that these amines will react with the free isocyanate groups of the prepolymer. In this context, these amines act more like chain terminators or chain extenders than neutralizing agents, and make the subsequent high molecular weight build-up during the aqueous chain extension step more difficult and less predictable. Thus, if primary and secondary amines are used, they should preferably be used as neutralizing agents prior to the formation of the prepolymer, i.e., when the potential ionic groups are converted to ionic groups prior to their incorporation into the prepolymer. However, the tertiary amines are preferred even when neutralization is conducted in this manner.

When the potential ionic groups of the prepolymer are neutralized, they provide hydrophilicity to the prepolymer and better enable it to be stably dispersed in water. The potential or unneutralized ionic groups do not provide this degree of hydrophilicity. Accordingly, a sufficient amount of the potential ionic groups must be neutralized so that when combined with the hydrophilic ethylene oxide units, the cross-linked polyurethane final product will be a stable, colloidal dispersion. When large amounts of potential ionic groups are incorporated into the prepolymer, only a portion of these groups may need to be neutralized to provide the necessary amount of hydrophilicity. However, when small amounts of potential ionic groups are incorporated, it may be necessary to neutralize substantially all of these groups to obtain the desired amount of hydrophilicity. No firm guidelines can be given as to the amount of neutralization needed, since the dispersibility of the cross-linked urea-urethane depends on many factors including, but not limited to, the amount of hydrophilicity provided by the ethylene oxide units.

The neutralization steps may be conducted (1) prior to prepolymer formation by treating the component containing the potential ionic group(s), (2) after prepolymer formation, but prior to dispersing the prepolymer or (3) by adding the neutralizing agent to all or a portion of the dispersing water.

The reaction between the neutralizing agent and the potential ionic groups may be conducted between about 20° C. and 150° C., but is normally conducted at temperatures below about 100° C., preferably between about 30° and 80° C. and most preferably between about 50° and 70° C., with agitation of the reaction mixture.

After neutralization according to alternatives 1 and 2 above or during neutralization if alternative 3 is used, a dispersion of the prepolymer in water is formed. This may be done according to the following methods.

(1) Water is added to the prepolymer with agitation. During this process, the viscosity of the mixture increases significantly, since initially the organic phase is continuous. As the addition of water is continued, a point is reached where a phase change occurs and the aqueous phase becomes continuous and the viscosity decreases. The remaining portion of the water is then added. If alternative 3 is used for neutralization, then it is important that sufficient ionic groups be present to produce a stable dispersion at the point of phase change when combined with the hydrophilic effect of the ethylene oxide units. This problem may be obviated by adding all of the neutralizing agent with a portion of the dispersing water which is insufficient to cause the phase change, followed by the addition of the remaining water. This problem may also be overcome by incorporating excess hydrophilic ethylene oxide units and/or potential ionic groups into the prepolymer, or by using an excess of the neutralizing agent. These latter methods, although less preferred, will ensure that the prepolymer is sufficiently hydrophilic at the point of phase change to form a stable dispersion.

(2) The prepolymer is added to the water, either in a batch-type process or continuously by using pin-mixers. When this method is used, significant increases in viscosity do not occur. In addition, if alternative 3 is used for neutralization, all of the neutralization agent is present in the water prior to the addition of the prepolymer.

The prepolymer is usually added in increments to the water or water-neutralizing agent mixture. The aqueous mixture is preferably agitated during the addition of the prepolymer to assist in forming the dispersion. Any low boiling solvent present during prepolymer formation may be removed prior to dispersing the prepolymer; however, it is preferred to remove the solvent after the dispersion is formed since the solvent will facilitate the formation of the dispersion, and also, the subsequent cross-linking reaction with the polyfunctional amine. The presence of solvent is especially preferred when the dispersion is formed according to method 1, since it helps to reduce the viscosity peak normally encountered with this process.

After the formation of the dispersed, isocyanate-terminated prepolymer the polyfunctional amine cross-linking agent should be added before the reaction of the terminal isocyanate groups with water proceeds to any significant extent, normally within about 30 minutes, preferably within about 15 minutes.

The cross-linked, urea-urethane products of the present invention are formed by reacting the dispersed prepolymer with a polyfunctional amine or a mixture of polyfunctional amines. The average functionality of the amine, i.e., the number of amine nitrogens per molecule, should be between about 2.2 and 6.0, preferably between about 2.2 and 4 and most preferably between about 2.2 and 3. The desired functionalities can be obtained by using mixtures of polyamines. For example, a functionality of 2.5 can be achieved by using equimolar mixtures of diamines and triamines. A functionality of 3.0 can be achieved either by using
(1) triamines,
(2) equimolar mixtures of diamines and tetramines,
(3) mixtures of 1 and 2, or
(4) any other suitable mixtures.
These other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substituents provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)amine, N-(2-piperazinoethyl) ethylene diamine, N,N'-bis-(2-aminoethyl)piperazine, N,N,N'-tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)-ethylene diamine and 2,4-bis-(4'-aminobenzyl)-aniline. Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine.

The amount of polyfunctional amine to be used in accordance with the present invention is dependent upon the number of terminal isocyanate groups in the prepolymer. Generally, the ratio of terminal isocyanate groups of the prepolymer to the amino hydrogens of the polyfunctional amine is between about 1.0:06 and 1.0:1.1, preferably between about 1.0:0.8 and 1.0:0.98 on an equivalent basis. Lesser amounts of polyfunctional amine will allow for too much undesired reaction of the isocyanate groups with water, while an undue excess may lead to products with low molecular weight and less than the desired amount of cross-linking. For the purposes of these ratios a primary amino group is considered to have one amino hydrogen. For example, ethylene diamine has two eqivalents of amino hydrogens and diethylene triamine has three equivalents.

The reaction between the dispersed prepolymer and the polyamine is conducted at temperatures from about 5° to 90° C., preferably from about 20° to 80° C., and most preferably from about 30° to 60° C. The reaction conditions are normally maintained until the isocyanate groups are essentially completely reacted. In order to reduce the presence of localized concentration gradients, the polyamine is preferably added in increments to the dispersed prepolymer which is normally agitated to ensure complete mixing of the polyamine throughout the aqueous medium. The polyamine may be added to the aqueous medium in its pure form or it may be dissolved or dispersed in water or an organic solvent. Suitable organic solvents are those previously described for use in preparing the isocyanate-terminated prepolymer.

The final product is a stable, aqueous dispersion of colloidally-sized particles of cross-linked urea-urethanes. The particle size is generally below about 1.0 micron, and preferably between about 0.001 to 0.5 micron. The average particle size should be less than about 0.5 micron, and preferably between 0.01 to 0.3 micron. The small particle size enhances the stability of the dispersed particles and also leads to the production of films with high surface gloss.

Prior to the present invention the production of highly cross-linked films or coatings was extremely difficult since films or coatings produced from the prior art dispersions cracked during curing if a high degree of cross-linking was present. The present invention allows for the production of noncracking coatings or films even when the dispersed particles are highly cross-linked. This is believed to be due to the presence of the hydrophilic ethylene oxide units which provide for better coalescence of the cross-linked particles during the formation of coatings or films than that previously provided for by the hydrophilic ionic groups. In addition, the cross-linked aqueous dispersions of the present invention are very stable to adjustments in pH, and thus, can be used for a wide range of applications.

Even when the urea-urethane dispersions of the subject application contain ionic groups they are largely unaffected by electrolytes. This provides, for example, for the acid-catalyzed cross-linking of the latex particles with formaldehyde or formaldehyde derivatives; similarly they may be pigmented with electrolyte-active pigments or dyes. Another property of the dispersions according to the present invention is the fact that they may be coagulated under the action of heat which makes them suitable for processing into films permeable to water vapor simply by heating.

The dispersions may be blended with other dispersions, for example, with polyvinyl acetate, polyethylene, polystyrene, polybutadiene, polyvinyl chloride, polyacrylate and copolymer plastics dispersions. The addition of known, chemically nonfixed, preferably ionic, emulsifiers is also possible but, of course, not essential. Also, fillers, plasticizers, pigments, carbon black and silica sols may be incorporated into the dispersions.

The dispersions of the urea-urethanes in water are generally stable, storable and transportable, and may be processed at a later stage, for example, by foaming. In general, they dry directly into dimensionally stable plastics coatings, although formation of the end products may also be carried out in the presence of known cross-linking agents. Urea-urethanes having different properties may be obtained according to the chemical composition selected and to the urethane group content. Thus, it is possible to obtain soft tacky compositions, and thermoplastic and elastomeric products having a variety of different hardnesses up to glass-hard duroplasts. The hydrophilicity of the products may also vary within certain limits. The elastomeric products may be thermoplastically processed at elevated temperatures, for example, at from about 100° to 180° C., providing they are not highly cross-linked.

The end products of the process are suitable for coating and impregnating woven and nonwoven textiles, leather, paper, wood, metals, ceramics, stone, concrete, bitumen, hard fibers, straw, glass porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

The dispersions may also be applied to a porous substrate which subsequently remains bonded to the end product, such as woven or nonwoven textile structures and fiber mats, felts or nonwovens, also paper webs, foam sheeting or split leather which by virtue of their absorbing action cause the coating to harden immediately. This is followed by drying and, optionally, pressing at elevated temperatures. However, drying may also be carried out on smooth, porous or nonporous materials, for example, metal, glass, paper, cardboard, ceramic materials, sheet steel, silicone rubber, aluminum foil, the end sheet structure subsequently being lifted off and used as such, or applied to a substrate using the reversal process by bonding, flame lamination or calendering. Application by the reversal process may be carried out at any time.

The properties of the end products may be modified by using vinyl polymers or active and inactive fillers. It is possible to use, for example, polyethylene, polypropylene, polyvinyl acetate, ethylene/vinyl acetate copolymers which may optionally be (partially) hydrolyzed and/or grafted with vinyl chloride, styrene-butadiene copolymers, ethylene (graft) copolymers, polyacrylates, carbon black, silica, asbestos, talcum, kaolin, titanium dioxide and glass in the form of powder or in the form of fibers or cellulose. Depending upon the required property spectrum and the application envisaged for the end products, up to about 70%, based on total dry substance, of these fillers may be present in the end product. Dyes or additives which influence flow properties may, of course, also be added.

Drying of the products obtained by various application techniques may be carried out either at room temperature or at elevated temperature. The drying temperature to be selected in each individual case, which is governed not only by the chemical compositions of the material, but above all by its moisture content, the drying time and the layer thickness, is readily determined by a preliminary test. For a given heating time, the drying temperature must always be below the solidification temperature.

Extremely hard polyurethanes obtained from finely divided dispersions and sols are suitable for use as stoving lacquers and, in some cases, even as air-drying lacquers. They combine extreme hardness and elasticity with high gloss, favorable light stability and weather resistance.

These polyurethane dispersions are specifically suited for coatings on vinyl fabrics used in automotive seating and commercial upholstery. In these application areas, properties like plasticizer barrier effect, improved abrasion resistance and good hydrolytic and UV-resistance are of importance. They are also useful as coatings for textiles such as tarpaulins, specifically for military application where properties like excellent toughness and retained properties after aging are essential.

Business machine housings which are made from plastic materials and where solvent borne coatings can attack the surface are another important application for these aqueous urea-urethanes. Additionally, they are excellently suited to coat bowling alleys, as chip resistance coatings in automotive applications, for furniture, aircraft, foil and paper. They are also valuable as a co-binder for acrylic dispersions to improve properties like alcohol resistance, flexibility and appearance of resulting coatings.

The invention is further illustrated, but is not intended to be limited by the following examples in which all parts and percentages are by weight unless otherwise specified.

EXAMPLES

EXAMPLE 1

An isocyanate-terminated prepolymer was prepared from the following charge:

| Grams | Charge |
| --- | --- |
| 117.6 | 1,6-hexanediol adipate $\overline{MW} = 840$ |
| 113.4 | bisphenol A propylene oxide ether $\overline{MW} = 514$ |
| 14.0 | dimethylolpropionic acid (DMPA) |
| 9.0 | *monofunctional ethylene oxide ether |

| Grams | Charge | |
|---|---|---|
| 60.0 | $\overline{MW} = 2145$ | |
| 165.5 | N—methyl-2-pyrrolidinone (NMP) | |
| 10.0 | bis-(4-isocyanatocylohexyl)-methane | |
| 113.7 | } Solution { triethylamine (TEA) N—methyl-2-pyrrolidinone | |

*A polyether monohydric alcohol prepared from n-butanol, ethylene oxide and propylene oxide (in a molar ratio ethylene oxide to propylene oxide of 83:17).

The 1,6-hexanediol adipate, bisphenol A propylene oxide ether, DMPA, ethylene oxide ether, and NMP were charged into a 1 liter 3 neck flask equipped with a thermometer, condenser with drying tube, and stirrer with a 3 inch blade. While stirring the mixture was heated to 100° C. for 30 minutes. The homogeneous mixture was cooled to 65° C., then the bis-(4-isocyanatocyclohexyl)-methane was added. The components were stirred and heated to 105° C. for 3 hours forming an NCO-terminated prepolymer with a calculated acid value of 14.0 (based on solids) and an NCO content of 2.78% (theoretical NCO=2.86%). The prepolymer was cooled to 65° C., then the TEA/NMP neutralizing solution was added and stirred 10 minutes while the temperature was maintained at 65° C.

While stirring rapidly, 540 grams of the neutralized prepolymer (65° C.) was transferred over an 8 minute period into a 2 liter resin flask (equipped with 2 turbin type stirring blades) containing 460 grams demineralized water (DMW) at 35° C.

An amine solution made up of 9.4 grams triethylenetetramine, 15 grams NMP and 100 grams DMW was slowly added to the dispersion over a 5 minute period. The resulting aqueous PUR dispersion was heated to 70° C. for 2 hours to react off any remaining free NCO. The resulting product was a stable, fine particle size urea-urethane dispersion with an ionic group content of 1.0% and an ethylene oxide content of 1.55%, based on the weight of the urea-urethane.

Product Data
  Found total solids=34.9%
  pH=8.3
  Viscosity=120 cps @ 25° C.
Film appearance
  Clear, hard, flexible coating.
Film properties
  Pencil hardness=H
  Water spot test=NE 24 hours
  Isopropyl alcohol spot test=Whitening after 2 hours, recovers

| Tensile data | | | | |
|---|---|---|---|---|
| Initial Modulus | 100% | Ultimate | Elongation | Set |
| 5400 psi | 4380 psi | 4410 psi | 110% | 85% |

EXAMPLE 2

An isocyanate-terminated prepolymer was prepared as in Example 1 from the following charge:

| Grams | Charge |
|---|---|
| 1375.0 | 1,6-hexanediol adipate $\overline{MW} = 840$ |
| 74.6 | 1,3-butanediol |
| 28.6 | neopentylglycol |

| Grams | Charge |
|---|---|
| 34.1 | monofunctional ethylene oxide ether $\overline{MW} = 2145$ |
| 198.0 | dimethylolpropionic acid |
| 1100.0 | N—methyl-2-pyrrolidinone |
| 1509.0 | bis-(4-isocyanatocyclohexyl)-methane |
| 145.2 | triethylamine |
| 380.0 | N—methyl-2-pyrrolidinone |

The NCO content of the above prepolymer was 2.93% (theoretical NCO=2.96%).

4,500 grams of the above neutralized prepolymer was dispersed as in Example 1 into 4,072 grams of 35° C. dimineralized water (DMW). The dispersing step in this case took 20 minutes. An amine solution made up of 37.8 grams ethylene diamine, 43.2 grams diethylene triamine, and 511 grams DMW was slowly added over an 8–10 minute period to the dispersion. The final dispersion was heated to 70° C. for 2 hours to react off any remaining free NCO.

The resulting aqueous urea-urethane dispersion had a clear, solution-like appearance and contained 1.8% ionic groups and 0.75% ethylene oxide units, based on the weight of the urea-urethane.

Product Data
  Found total solids=36.2%
  pH=8.5
  Viscosity=600 cps @ 25° C.
Film appearance
  Clear, hard and flexible.
Film properties
  Pencil harndess=2H
  Water spot test=NE 24 hours
  Isopropyl alcohol spot test=NE 1 hour, softening after 2 hour

| | Tensile properties (in psi) | | | | |
|---|---|---|---|---|---|
| Initial Modulus | 100% | 200% | Ultimate | Elongation | Set |
| 4120 | 3800 | 5800 | 6300 | 220% | 140% |

EXAMPLE 3

An aqueous urea-urethane dispersion was prepared with the same charge as Example 2. The only changes in the procedure were:

1. The addition of the triethylamine to the polyol/DMPA mix at 75° C. prior to the addition of the bis-(4-isocyanatocyclohexyl)-methane bringing about neutralization prior to the prepolymerization step, and 2. The prepolymer was prepared at 85°-90° C. instead of from 105°-110° C. The resulting aqueous urea-urethane dispersion had a clear solution-like appearance and contained 1.8% ionic groups and 0.75% ethylene oxide units, based on the weight of the urea-urethane.

Product Data
  Found total solids=34.8%
  pH=7.95
  Viscosity=500 cps @ 25° C.

EXAMPLE 4

An isocyanate-terminated prepolymer was prepared following the same procedure as in Example 1 with the following charge:

| Grams | Charge |
|---|---|
| 286.0 | 1,6-hexanediol adipate $\overline{MW}$ = 840 |
| 19.8 | neopentylglycol |
| 15.6 | 1,3-butanediol |
| 17.0 | monofunctional ethylene oxide ether $\overline{MW}$ = 2145 |
| 26.0 | dimethylolpropionic acid |
| 240.0 | N—methyl-2-pyrrolidinone |
| 321.8 | bis-(4-isocyanatocyclohexyl)-methane |
| 19.2 | triethylamine |
| 70.0 | N—methyl-2-pyrrolidinone |

The NCO content of the above unneutralized prepolymer was 2.90% (theoretical NCO=2.94%). The neutralizing, dispersing and subsequent amine solution addition steps were carried out in the same manner as Example 1 with the following charge (based on 900.0 grams of the neutralized prepolymer).

| Grams | | Charge | |
|---|---|---|---|
| 840.0 | | demineralized water (DMW) | |
| 6.1 | amine | ethylene diamine (EDA) | |
| 10.5 | solution | diethylene triamine (DETA) | |
| 75.0 | | DMW | |

The resulting aqueous urea-urethane dispersion had a hazy, translucent, fine particle size appearance and contained 1.15% ionic groups and 1.78% ethylene oxide units, based on the weight of the urea-urethane.
Product Data
  Found total solids = 36.6%
  pH = 8.35
  Viscosity = 690 cps @ 25° C.
Film Appearance
  Clear, hard and flexible.
Film properties
  Pencil hardness = H-2H
  Water spot test = NE 24 hours
  Isopropyl alcohol spot test = softening after 1 hour, recovers

| Initial Modulus | Tensile properties (in psi) | | | |
|---|---|---|---|---|
| | 100% | Ultimate | Elongation | Set |
| 4500 | 3900 | 5000 | 160% | 70% |

EXAMPLE 5

An isocyanate-terminated prepolymer was prepared following the same procedure as in Example 1 with the following charge:

| Grams | Charge |
|---|---|
| 152.9 | 1,6-hexanediol adipate $\overline{MW}$ = 840 |
| 12.2 | dimethylolpropionic acid |
| 2.7 | monofunctional ether $\overline{MW}$ = 2145 (as in Example 1) |
| 75.6 | N—methyl-2-pyrrolidinone (NMP) |
| 93.3 | bis-(4-isocyanatocyclohexyl)-methane |
| 8.7 | triethylamine |
| 52.0 | NMP |

The NCO content of the above unneutralized prepolymer was 1.64% (theoretical NCO=2.05%). The neutralizing, dispersing and subsequent amine solution addition steps were carried out in the same manner as Example 1 with the following charge (based on 350 grams of the neutralized prepolymer):

| Grams | | Charge | |
|---|---|---|---|
| 350.0 | | demineralized water (DMW) | |
| 4.0 | amine | tetraethylenepentamine | |
| 55.0 | solution | DMW | |

The resulting aqueous urea-urethane dispersion had a clear, solution-like appearance and contained 1.4% ionic groups and 0.75% ethylene oxide units, based on the weight of the urea-urethane.
Product Data
  Found total solids = 32.0%
  pH = 8.4
  Viscosity = 520 cps @ 25° C.

EXAMPLE 6

An isocyanate-terminated prepolymer was prepared following the same procedure used in Example 1 with the following charge:

| Grams | Charge |
|---|---|
| 294.0 | 1,6-hexanediol adipate $\overline{MW}$ = 840 |
| 18.0 | dimethylolpropionic acid |
| 145.0 | N—methyl-2-pyrrolidinone (NMP) |
| 165.2 | bis-(4-isocyanatocyclohexyl)-methane |
| 13.3 | triethylamine |
| 62.8 | NMP |

The NCO content of the unneutralized prepolymer was 1.77% (theoretical value=1.96%). The neutralized prepolymer was transferred almost quantitatively into the dispersing water. The addition of the amine solution was carried out as in Example 1 using the following charge:

| Grams | | Charge | |
|---|---|---|---|
| 578.8 | | demineralized water (DMW) | |
| 8.1 | amine | diethylenetriamine | |
| 100.0 | solution | DMW | |

(100 grams DMW was then added to reduce the viscosity of the final dispersion.)
The resulting aqueous urea-urethane dispersion had a clear, solution-like appearance and an ionic group content of 1.16% based on the weight of the urea-urethane. Films cast from this material cracked.
Product Data
  Found total solids = 32.5%
  pH = 8.4
  Viscosity = 130 cps @ 25° C.

EXAMPLE 7

An isocyanate-terminated prepolymer was prepared following the same procedure used in Example 1 with the charge listed below:

| Grams | Charge |
|---|---|
| 294.0 | 1,6-hexanediol adipate $\overline{MW}$ = 840 |
| 17.5 | dimethylolpropionic acid |

-continued

| Grams | Charge |
|---|---|
| 15.0 | monofunctional ethylene oxide ether $\overline{MW}$ = 2145 |
| 145.0 | N—methyl-2-pyrrolidinone (NMP) |
| 165.1 | bis-(4-isocyanatocyclohexyl)-methane |
| 12.9 | triethylamine |
| 68.5 | NMP |

The NCO content of the unneutralized prepolymer was 1.7% (theoretical value=1.91%). The neutralized prepolymer was transferred almost quantitatively into the dispersing water. The addition of the amine solution was carried out as in Example 1 using the following charge:

| Grams | | Charge | |
|---|---|---|---|
| 597.6 | | | demineralized water (DMW) |
| 8.0 | } amine solution { | diethylenetriamine |
| 100.0 | | | DMW |

(100 grams DMW was then added to reduce the viscosity of the final dispersion.)

The resulting aqueous urea-urethane dispersion had a clear, solution-like appearance and contained 1.1% ionic groups and 2.2% ethylene oxide units, based on the weight of the urea-urethane. Films cast from this material were clear, soft and crack-free.

Product Data
 Found total solids=32.8%
 pH=8.0
 Viscosity=800 cps @ 25° C.

EXAMPLE 8

An isocyanate-terminated prepolymer was prepared from the following charge:

| Grams | Charge |
|---|---|
| 340.0 | 1,6-hexanediol, neopentyl glycol adipate $\overline{MW}$ = 1700* |
| 21.5 | monofunctional ethylene oxide ether $\overline{MW}$ = 2145 |
| 40.0 | N—methyl-2-pyrrolidinone (NMP) |
| 127.5 | bis-(4-isocyanatocyclohexyl)-methane |

*available from Bayer AG as Polyester Product 00128.

The 1,6-hexanediol, neopentyl glycol adipate, ethylene oxide ether and NMP were charged into a 1 liter 3 neck flask equipped with a condenser with drying tube, a thermometer and a stirrer with a 3 inch blade. While stirring this mixture was heated to 80° C. until homogeneity was reached. The bis-(4-isocyanatocyclohexyl)methane was then added and the temperature increased to 120° C. After 2 hours an NCO-terminated prepolymer was formed with an NCO content of 4.02% (theoretical=4.46%). The prepolymer was then cooled to 70° C. at which temperature 23.8 grams N-methyldiethanolamine and 40.0 grams NMP were added. After stirring 1 hour at 70° C., 23.9 grams dimethylsulfate and 100 grams NMP were added and allowed to stir 1 hour at 70° C. 650 grams of this cationic prepolymer were slowly added to a resin flask equipped with 2 turbin type propeller stirrers which contained 890 grams 50° C. demineralized water. After the dispersion was stirred 5 minutes an amine solution made up of 4.9 grams diethylenetriamine and 90 grams demineralized water was slowly added. The product was then heated to 70° C. for 2 hours to react off any remaining free NCO. Sufficient phosphoric acid was added to the final dispersion to bring the pH to between 2 and 3. The resulting aqueous urea-urethane dispersion had a white, fine particle size appearance with a blue Tyndall effect. It contained 0.51% ionic groups and 3.02% ethylene oxide units, based on the weight of the urea-urethane.

Product Data
 Found total solids=30.5%
 pH=2.4
 Viscosity=740 cps @ 25° C.

EXAMPLE 9

An isocyanate-terminated prepolymer was prepared as in Example 1 from the following charge:

| Grams | Charge |
|---|---|
| 244.8 | 1,6-hexanediol, neopentyl glycol adipate $\overline{MW}$ = 1700 (as in Example 8) |
| 17.1 | monofunctional ethylene oxide ether $\overline{MW}$ = 2145 |
| 31.6 | *sulfonatediol |
| 44.4 | isophorone diisocyanate |
| 33.6 | hexamethylene diisocyanate |

*[prepared from 1 mole of NaHSO$_3$ and 1 mole of propoxylated (3.8 mole of propylene oxide)butene-2-diol-(1,4), $\overline{MW}$ 448, added as a 70% solution in toluene.]

The NCO content of the above prepolymer was 4.07% (theoretical=4.5%). The dispersing and amine solution addition were carried out as in Example 1 with the following charge (based on 340 grams of the above prepolymer):

| Grams | | Charge | |
|---|---|---|---|
| 434.0 | | | demineralized water (DMW) |
| 3.6 | } amine solution { | ethylenediamine |
| 6.1 | | | diethylenetriamine |
| 90.0 | | | DMW |

The resulting aqueous urea-urethane dispersion had a white, fine particle size appearance with a blue Tyndall effect. It contained 1.06% ionic groups and 3.49% ethylene oxide units, based on the weight of the urea-urethane.

Product Data
 Found total solids=42.5%
 pH=7.4
 Viscosity=900 cps @ 25° C.

EXAMPLE 10

An isocyanate-terminated prepolymer was prepared using the same procedure as Example 1 from the following charge:

| Grams | Charge |
|---|---|
| 294.0 | 1,6-hexanediol adipate $\overline{MW}$ = 840 |
| 19.5 | dimethylolpropionic acid |
| 145.0 | N—methyl-2-pyrrolidinone |
| 169.0 | bis-(4-isocyanatocyclohexyl)-methane |
| 14.4 | triethylamine |
| 64.3 | N—methyl-2-pyrrolidinone |

The NCO content of the above unneutralized prepolymer was 1.60% (theoretical NCO=2.0%). The neutralized prepolymer was transferred almost quantitatively into the dispersing water. The addition of the amine solution was carried out as in Example 1 using the following charge:

| Grams | | Charge | |
|---|---|---|---|
| 629.1 | | | demineralized water (DMW) |
| 7.9 | } amine solution | { | triethylenetetramine |
| 100.0 | | | DMW |

The resulting aqueous urea-urethane dispersion had a solution-like, translucent, fine particle size appearance and contained 1.25% ionic groups, based on the weight of the urea-urethane.
Product Data
  Found total solids = 34.6%
  pH = 8.1
Film appearance
  Hazy, soft and flexible with microcracking. Gloss at 60° geometry = 79

EXAMPLE 11

Example 10 was repeated with 0.5% (on solids) of a monofunctional ethylene oxide ether (prepared as in Example 1) chemically incorporated into the prepolymer. The complete aqueous polyurethane dispersion composition was as follows:

| Grams | Charge |
|---|---|
| 294.0 | 1,6-hexanediol adipate $\overline{MW}$ = 840 |
| 19.8 | dimethylolpropionic acid |
| 2.5 | monofunctional ethylene oxide ether $\overline{MW}$ = 2145 |
| 145.0 | N—methyl-2-pyrrolidinone |
| 170.0 | bis-(4-isocyanatocyclohexyl)-methane |
| 14.6 | triethylamine |
| 65.0 | N—methyl-2-pyrrolidinone |
| 632.6 | demineralized water |
| 7.9 | triethylenetetramine |
| 100.0 | DMW |

The resulting aqueous urea-urethane dispersion had a hazy, translucent, fine particle size appearance and contained 1.25% ionic groups and 0.37% ethylene oxide units, based on the weight of the urea-urethane.
Product Data
  Found total solids = 34.6%
  pH = 8.3
Film appearance
  Clear, glossy, flexible, soft, and crack-free.
  Gloss at 60° C. geometry = 94.

EXAMPLE 12

An NCO-terminated prepolymer was prepared following the same procedure as Example 1 from the following charge:

| Grams | Charge |
|---|---|
| 105.2 | polytetramethylene ether glycol $\overline{MW}$ = 2000 |
| 25.3 | dimethylolpropionic acid |
| 2.6 | monofunctional ethylene oxide ether $\overline{MW}$ = 2145 |
| 100.0 | N—methyl-2-pyrrolidinone (NMP) |
| 82.6 | bis-(4-isocyanatocyclohexyl)-methane |
| 18.7 | triethylamine (TEA) |

| Grams | Charge |
|---|---|
| 15.0 | NMP |

The NCO content of the unneutralized prepolymer was 1.93% (theoretical NCO = 1.93%). Following the addition of the TEA/NMP solution the dispersing and subsequent amine solution addition steps were carried out in the same manner as Example 1 with the following charge (based on 320 grams of the above prepolymer):

| Grams | | Charge | |
|---|---|---|---|
| 270.0 | | | demineralized water (DMW) |
| 1.5 | } amine solution | { | ethylenediamine |
| 2.5 | | | diethylenetriamine |
| 30.0 | | | DMW |

The resulting aqueous urea-urethane dispersion had a solution-like, translucent, fine particle size appearance and contained 3.41% ionic groups and 0.82% ethylene oxide units, based on the weight of the urea-urethane.
Product Data
  Found total solids = 26.0%
  pH = 7.8
  Viscosity = 1440 cps @ 25° C.

EXAMPLE 13

An isocyanate-terminated prepolymer was prepared following the same procedure as in Example 1 from the following charge:

| Grams | Charge |
|---|---|
| 1375.0 | 1,6-hexanediol adipate $\overline{MW}$ = 840 |
| 28.6 | neopentylglycol |
| 74.6 | 1,3-butanediol |
| 198.0 | dimethylolpropionic acid |
| 34.1 | monofunctional ethylene oxide ether $\overline{MW}$ = 2145 |
| 1100.0 | N—methyl-2-pyrrolidinone (NMP) |
| 1509.2 | bis-(4-isocyanatocyclohexyl)-methane |
| 145.2 | triethylamine |
| 380.0 | NMP |

The NCO content of the above unneutralized prepolymer was 2.93% (theoretical NCO = 2.96%). The neutralizing, dispersing and subsequent amine solution addition steps were carried out in the same manner as Example 1 with the following charge (based on 4500 grams of the neutralized prepolymer):

| Grams | | Charge | |
|---|---|---|---|
| 4072.0 | | | demineralized water (DMW) |
| 37.8 | } amine solution | { | ethylenediamine |
| 43.2 | | | diethylenetriamine |
| 511.0 | | | DMW |

The resulting aqueous urea-urethane dispersion had a clear, fine particle size, solution-like appearance and contained 1.83% ionic groups and 0.75% ethylene oxide units, based on the weight of the urea-urethane.
Product Data
  Found total solids = 36.2%
  pH = 8.5
  Viscosity = 610 cps @ 25° C.

Film appearance
Continuous clear, hard, flexible film.
Film properties
  Pencil hardness=2H
  Water spot test=NE 24 hours
  Isopropyl alcohol spot test=softening after 2 hours

| Tensile properties (in psi) | | | | |
|---|---|---|---|---|
| Initial Modulus | 100% | Ultimate Modulus | % Elongation | % Set |
| 4600 | 4200 | 5400 | 180 | 80 |

| % Volume Solvent Swell[1]-24 Hour Immersion | | | | |
|---|---|---|---|---|
| Water | Methyl Ethyl Ketone | Cellosolve Acetate | Xylene | 1,1,1-Trichloroethane |
| 0 | 174 | 120 | 95 | 205 |

Ericksen Pendulum Hardness Development of Drying Films[2]
Films were cast 8 mils wet on 3" × 6" glass panels
and allowed to dry at ambient temperatures.

| 4 hrs. | 6 hrs. | 24 hrs. | 48 hrs. | 5 days | 12 days |
|---|---|---|---|---|---|
| 11 sec. | 13 | 68 | 98 | 117 | 119 |

Pendulum Hardness after a 15 minute bake at 175° F. = 92
Pendulum Hardness after a 10 minute bake at 300° F. = 120

[1]Volume Solvent Swell
One inch by one inch squares are cut out from a well-cured free film (approximately 1.5 mils in thickness) of the coating resin to be evaluated using an appropriate cutting die. The specimen square is immersed in the chosen solvent contained in a 3¼" diameter Petri dish. The dish is covered and maintained at room temperature. At the desired interval of measurement the dimensions of the film specimen are determined. The percentage volume swell is calculated from the following formula:
% volume swell = $100 \, L^3 - 100$
where L = longest measured dimension in inches.

[2]Ericksen Pendulum Hardness
A film of the coating resin to be evaluated is cast on a 3" × 6" glass plate with an appropriate applicator knife. The Ericksen Pendulum Hardness Tester is levelled, and at the desired interval of measurement the glass plate is placed on the sample stage of the hardness tester. The fulcrum points of the pendulum are lowered on the curing film, the pendulum is deflected 6° and released. The time for the pendulum to damp to a 3° deflection is recorded.

Wyzenbeek[3] Abrasion Resistance 98 grams of the dispersion were treated with 2 grams Silicone Surfactant L-77 (Union Carbide Corporation) and films were cast from this material on uncoated vinyl fabric with a 95Q quadragravure roller resulting in dry films of 0.05-0.1 mil thickness. They were dried in a force draft oven at 250° F. for 1 minute. The samples were clamped to the Wyzenbeek abrasion tester with 4 pounds tension and 3 pounds pressure. The coating showed no signs of wear after 25,000 cycles of abrasion with #8 cotton duck cloth.

[3]Precision Wear Test Meter manufactured by Wyco Tool Company.

The following additional procedures were used to obtain the data set forth in the preceding examples.

(1) Pencil Hardness was determined according to ASTM D 3363 with a Micrometrics Co. pencil hardness gage.

(2) Tensile Properties were determined according to ASTM D 538 using a type 4 die.

(3) Gloss was determined according to ASTM D-523-67 at 60° geometry.

(4) Water and Isopropyl Alcohol Spot Tests were conducted by making a 10 mil wet drawdown of the urea-urethane dispersions on Bonderite ® treated test panels* (24 gauge cold rolled steel-flat polished, 3"×9") and allowing them to air dry at ambient temperatures for 24 hours. A cottonball soaked with either water or isopropyl alcohol was placed on the film and covered by a watch glass. The film was then checked periodically for the following:
  (a) no effects (NE),
  (b) whitening,
  (c) softening (cotton sticks to film),
  (d) blistering, and
  (e) dissolving.

*a registered trademark of Oxy Metal Industries Corporation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a stable, colloidal, aqueous dispersion of cross-linked urea-urethanes which comprises
  (a) forming a substantially linear, isocyanate-terminated prepolymer having a molecular weight of up to about 25,000 by reacting
    (i) an organic polyisocyanate which contains at least two aliphatically or cycloaliphatically bound isocyanate groups,
    (ii) an organic compound which has at least two isocyanate-reactive groups,
    (iii) an organic compound which comprises a member selected from the group consisting of diisocyanates which contain lateral, hydrophilic ethylene oxide units; compounds which are difunctional in the isocyanate-polyaddition reaction and contain lateral, hydrophilic ethylene oxide units; monoisocyanates which contain terminal, hydrophilic ethylene oxide units; compounds which are monofunctional in the isocyanate-polyaddition reaction and contain terminal, hydrophilic ethylene oxide units, and mixtures thereof; and optionally,
    (iv) an organic compound which comprises a member selected from the group consisting of monoisocyanates or diisocyanates which contain ionic group(s) or potential ionic group(s); and compounds which are monofunctional or difunctional in the isocyanate-polyaddition reaction and contain ionic group(s) or potential ionic group(s),
  wherein components (i), (ii), (iii) and (iv) are reacted in the presence of excess isocyanate groups and are chosen to provide a ratio of isocyanate groups to isocyanate-reactive groups of about 1.1 to 3.0 on an equivalent basis; component (iii) is present in an amount sufficient to provide about 0.35 to 10% by weight, based on the weight of the prepolymer, of lateral and/or terminal, hydrophilic ethylene oxide units; and component (iv) is treated with a neutralizing agent either before, during or after formation of the prepolymer in an amount sufficient to provide up to about 120 milliequivalents of ionic groups per 100 grams of said prepolymers, the amount of component (iii) and the neutralized portion of component (iv) being present in an amount sufficient to provide a stable, aqueous dispersion of the prepolymer;
  (b) forming a dispersion of said prepolymer in water; and subsequently
  (c) chain extending said prepolymer to form said cross-linked urea-urethane with a sufficient amount of a polyfunctional amine chain extender having an average functionality (number of amine nitrogens per molecule) between about 2.2 and 6.0 to provide a ratio of the terminal isocyanate groups of the prepolymer to the amino hydrogens of the polyfunctional amine of between about 1.0:0.6 and 1.0:1.1.

2. The process of claim 1 wherein component (i) is an organic diisocyanate.

3. The process of claim 1 wherein component (ii) comprises a high molecular weight organic compound having a molecular weight from about 300 to 6,000.

4. The process of claim 3 wherein said high molecular weight component is a difunctional compound comprising a member selected from the group consisting of polyesters, polylactones, polycarbonates, polyethers, polythioethers, polyacetals, polyether esters and mixtures thereof.

5. The process of claim 3 wherein said high molecular weight component is a dihydroxy compound comprising a member selected from the group consisting of polyesters, polyethers and polycarbonates.

6. The process of claim 5 wherein said high molecular weight component has a molecular weight from about 300 to 3000.

7. The process of claim 1 wherein component (ii) comprises a low molecular weight component having a molecular weight of up to about 300.

8. The process of claim 1 wherein component (iii) comprises a compound which is difunctional in the isocyanate-polyaddition reaction and contains lateral, hydrophilic ethylene oxide units.

9. The process of claim 1 wherein component (iii) comprises a compound which is monofunctional in the isocyanate-polyaddition reaction and contains terminal, hydrophilic ethylene oxide units.

10. The process of claim 1 wherein component (iii) corresponds to the formula

H—Y'—X—Y—R'' wherein
R'' represents a monovalent hydrocarbon radical having from 1 to 12 carbon atoms;
X represents the radical obtained by removal of the terminal oxygen atom from a polyalkylene oxide chain having from about 5 to 90 chain members of which at least about 40% comprises ethylene oxide units and the remainder comprises other alkylene oxide units;
Y represents oxygen or —NR'''—;
Y' represents oxygen, —NH— or —NR'''—; and
R''' has the same definition as R''.

11. The process of claim 10 wherein
R'' represents an unsubstituted alkyl radical having from 1 to 4 carbon atoms;
X represents the radical obtained by removal of the terminal oxygen atom from a polyalkylene oxide chain having from about 20 to 70 chain members of which at least about 65% comprises ethylene oxide units and the remainder comprises other alkylene oxide units selected from the group consisting of propylene oxide, butylene oxide, styrene oxide and mixtures thereof; and
Y and Y' represent oxygen.

12. The process of claim 11 wherein said other alkylene oxide units are propylene oxide units.

13. The process of claim 9 wherein component (iii) is present in an amount from 0.8 to 10% based on the weight of the prepolymer.

14. The process of claim 1 wherein component (iv) comprises compounds which are monofunctional in the isocyanate-polyaddition reaction and contain ionic group(s) or potential ionic group(s).

15. The process of claim 1 wherein component (iv) comprises compounds which are difunctional in the isocyanate-polyaddition reaction and contain ionic group(s) or potential ionic group(s).

16. The process of claim 1 wherein the ionic groups of component (iv) comprise a member selected from the group consisting of —COO$^\oplus$, —SO$_3^\oplus$,

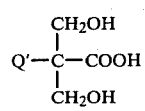

17. The process of claim 1 wherein the ionic groups are introduced into the prepolymer by sulfonic acid-containing diols which may be neutralized to form the ionic groups either before, during or after formation of the prepolymer.

18. The process of claim 1 wherein the ionic groups are introduced into the prepolymer by tertiary nitrogen-containing diols which may be neutralized to form the ionic groups either before, during or after formation of the prepolymer.

19. The process of claim 1 wherein the ionic groups are introduced into the prepolymer by hydroxycarboxylic acids of the formula (HO)$_x$Q(COOH)$_y$ wherein
Q represents a straight or branched hydrocarbon radical containing 1 to 12 carbon atoms, and
x and y represent values from 1 to 3,
said acids being neutralized to form the ionic groups either before, during or after formation of the prepolymer.

20. The process of claim 1 wherein the ionic groups are introduced into the prepolymer by dihydroxy alkanoic acids of the formula $$\begin{array}{c} CH_2OH \\ | \\ Q'—C—COOH \\ | \\ CH_2OH \end{array}$$

wherein Q' represents hydrogen or an alkyl group containing 1 to 8 carbon atoms,
said acids being neutralized to form the ionic groups either before, during or after formation of the prepolymer.

21. The process of claim 20 wherein Q' represents methyl.

22. The process of claim 1 wherein said polyfunctional amine comprises a member selected from the group consisting of ethylene diamine, bis-(4-aminocyclohexyl)-methane, bis-(4-amino-3-methyl-cyclohexyl)methane, 1,6-diaminohexane, 1-amino-3-aminomethyl-3,5,5-trimethylcyclohexane, diethylene triamine, triethylene tetramine, tetraethylenepentamine, pentamethylene hexamine and mixtures thereof.

23. The process of claim 1 wherein the ratio of the terminal isocyanate groups of the prepolymer to the amino hydrogens of the polyfunctional amine is between about 1.0:0.8 and 1.0:0.98 on an equivalent basis.

24. The process of claim 1 wherein the average functionality of the polyfunctional amine is between about 2.2 and 4.0.

25. A process for the preparation of a stable, colloidal, aqueous dispersion of cross-linked urea-urethanes which comprises
  (a) forming a substantially linear, isocyanate-terminated prepolymer having a molecular weight of up to about 25,000 by reacting
    (i) an organic diisocyanate which contains aliphatically or cycloaliphatically bound isocyanate groups,
    (ii) an organic dihydroxy compound with a molecular weight from about 300 to 6,000 comprising a member selected from the group consisting of polyesters, polyethers and polycarbonates,
    (iii) an organic compound which is monofunctional or difunctional in the context of the isocyanatepolyaddition reaction and contains lateral or terminal, hydrophilic ethylene oxide units, and optionally,
    (iv) an organic compound comprising a member selected from the group consisting of sulfonic acid-containing diols, tertiary nitrogen-containing diols and hydroxy-carboxylic acids of the formula $(HO)_xQ(COOH)_y$ wherein
    Q represents a straight or branched hydrocarbon radical containing 1 to 12 carbon atoms, and
    x and y represent values from 1 to 3,
  wherein components (i), (ii), (iii) and (iv) are reacted in the presence of excess isocyanate groups and are chosen to provide a ratio of isocyanate groups to isocyanate-reactive groups of about 1.2 to 2.0 on an equivalent basis; component (iii) is present in an amount sufficient to provide about 0.35 to 10% by weight, based on the weight of prepolymer, of lateral and/or terminal, hydrophilic ethylene oxide units; and component (iv) is treated with a neutralizing agent either before, during or after formation of said prepolymer in an amount sufficient to provide about 0 to 120 milliequivalents of ionic groups per 100 grams of said prepolymer, the amount of component (iii) and the neutralized portion of component (iv) being present in an amount sufficient to provide a stable, aqueous dispersion of the prepolymer;
  (b) forming a dispersion of said prepolymer in water; and subsequently,
  (c) chain-extending said prepolymer to form said cross-linked urea-urethane with a polyfunctional amine comprising a member selected from the group consisting of ethylene diamine, 1-amino-3-aminomethyl-3,5,5-trimethylcyclohexane, diethylene triamine, triethylene tetramine, and mixtures thereof, wherein said polyfunctional amine has an average functionality (number of amine nitrogens per molecule) of about 2.2 and 4.0 and wherein the ratio of the terminal isocyanate groups of the prepolymer to the amino hydrogens of the polyfunctional amine is between about 1.0:0.6 and 1.0:1.1.

26. The process of claim 25 wherein component (iv) comprises a dihydroxy alkanoic acid of the formula $$\begin{array}{c} CH_2OH \\ | \\ Q'-C-COOH \\ | \\ CH_2OH \end{array}$$

wherein Q' represents hydrogen or an alkyl group containing 1 to 8 carbon atoms.

27. The process of claim 26 wherein component (iv) is neutralized with a sufficient amount of a tertiary amine either before, during or after formation of the prepolymer to provide about 10 to 60 milliequivalents of ionic groups per 100 g of prepolymer.

28. The process of claim 27 wherein said tertiary amine is triethylamine.

29. The process of claim 25 wherein said organic diisocyanate comprises a member selected from the group consisting of bis-(4-isocyanatocyclohexyl)-methane and 1-isocyanate-3-isocyanatomethyl-3,5,5-trimethylcyclohexane.

30. A process for the preparation of stable, colloidal, aqueous dispersions of cross-linked urea-urethanes which comprises
  (a) forming a substantially linear, isocyanate-terminated prepolymer having a molecular weight between about 600 and 12,000 by reacting
    (i) an organic diisocyanate comprising a member selected from the group consisting of bis-(4-isocyanatocyclohexyl)-methane and 1-isocyanato-3-isocyanatomethyl-3,5,5-trimethylcyclohexane,
    (ii) an organic dihydroxy compound with a molecular weight from about 300 to 3,000 comprising a member selected from the group consisting of polyesters, polyethers and polycarbonates,
    (iii) an organic compound which is monofunctional or difunctional in the context of the isocyanate-poly-addition reaction and contains lateral or terminal, hydrophilic ethylene oxide units and
    (iv) a dihydroxy alkanoic acid of the formula $$\begin{array}{c} CH_2OH \\ | \\ Q'-C-COOH \\ | \\ CH_2OH \end{array}$$

wherein Q' represents hydrogen or an alkyl group containing 1 to 8 carbon atoms, and
  wherein components (i), (ii), (iii) and (iv) are reacted in the presence of excess isocyanate groups and are chosen to provide a ratio of isocyanate groups to isocyanate-reactive groups of about 1.2 to 2.0 on an equivalent basis; component (iii) is present in an amount sufficient to provide about 0.35 to 10% by weight, based on the weight of the prepolymer, of lateral and/or terminal, hydrophilic ethylene oxide units; and component (iv) is neutralized with a tertiary amine either before, during or after formation of said prepolymer in an amount sufficient to provide about 10 to 60 milliequivalents of ionic groups per 100 grams of prepolymer, the amount of component (iii) and the neutralized amount of component (iv) being present in an amount sufficient to provide a stable, aqueous dispersion of the prepolymer;
  (b) forming a dispersion of said prepolymer in water and; subsequently, (c) chain extending said prepolymer to form said cross-linked urea-urethane with a polyfunctional amine comprising a member selected from the group consisting of ethylene diamine, bis-(4-aminocyclohexyl)methane, 1-amino-3-aminomethyl-3,5,5-trimethylcyclohexane, diethylene triamine, triethylene tetramine and mixtures thereof, wherein said polyfunctional amine has an average functionality (number of amine nitrogens per molecule) between about 2.2 and 4.0 and wherein the ratio of the terminal isocyanate groups of the prepolymer to the amino hydrogen of the polyfunctional amine is between about 1.0:0.8 and 1.0:0.98.

31. The process of claim 30 wherein Q' represents methyl.

32. The process of claim 30 wherein said tertiary amine comprises triethylamine.

33. The process of claim 1, 25 and 30 wherein component (i) comprises bis-(4-isocyanatocyclohexyl)methane.

34. A stable, colloidal, aqueous dispersion of cross-linked urea-urethanes which is prepared by
   (a) forming a substantially linear, isocyanate-terminated prepolymer having a molecular weight of up to about 25,000 from the reaction product of
      (i) an organic polyisocyanate which contains at least two aliphatically or cycloaliphatically bound isocyanate groups,
      (ii) an organic compound which has at least two isocyanate-reactive groups,
      (iii) an organic compound which comprises a member selected from the group consisting of diisocyanates which contain lateral, hydrophilic ethylene oxide units; compound which are difunctional in the isocyanate-polyaddition reaction and contain lateral, hydrophilic ethylene oxide units; monoisocyanates which contain terminal, hydrophilic ethylene oxide units; compounds which are monofunctional in the iso- cyanate-polyaddition reaction and contain terminal, hydrophilic ethylene oxide units, and mixtures thereof; and optionally,
      (iv) an organic compound whch comprises a member selected from the group consisting of monoisocyanates or diisocyanates which contain ionic group(s) or potential ionic group(s); and compounds which are monofunctional or difunctional in the isocyanate-polyaddition reaction and contain ionic group(s) or potential ionic group(s),
   wherein components (i), (ii), (iii) and (iv) and reacted in the presence of excess isocyanate groups and are chosen to provide a ratio of isocyanate groups to isocyanate-reactive groups of about 1.1 to 3.0 on an equivalent basis; component (iii) is present in an amount sufficient to provide about 0.35 to 10% by weight, based on the weight of the prepolymer, of lateral and/or terminal, hydrophilic ethylene oxide units; and component (iv) is treated with a neutralizing agent either before, during or after formation of the prepolymer in an amount sufficient to provide up to about 120 milliequivalents of ionic groups per 100 grams of said prepolymers, the amount of component (iii) and the neutralized portion of component (iv) being present in an amount sufficient to provide a stable, aqueous dispersion of the prepolymer;
   (b) forming a dispersion of said prepolymer in water; and subsequently
   (c) chain extending said prepolymer to form said cross-linked urea-urethane with a sufficient amount of a polyfunctional amine chain extender having an average functionality (number of amine nitrogens per molecule) between about 2.2 and 6.0 to provide a ratio of the terminal isocyanate groups of the prepolymer to the amino hydrogens of the polyfunctional amine of between about 1.0:0.6 and 1.0:1.1.

35. The product of claim 34 wherein component (i) is an organic diisocyanate.

36. The product of claim 34 wherein component (ii) comprises a high molecular weight organic compound having a molecular weight from about 300 to 6,000.

37. The product of claim 36 wherein said high molecular weight component is a difunctional compound comprising a member selected from the group consisting of polyesters, polylactones, polycarbonates, polyethers, polythioethers, polyacetals, polyether esters and mixtures thereof.

38. The product of claim 36 wherein said high molecular weight component is a dihydroxy compound comprising a member selected from the group consisting of polyesters, polyethers and polycarbonates.

39. The product of claim 38 wherein said high molecular weight component has a molecular weight from about 300 to 3,000.

40. The product of claim 34 wherein component (ii) comprises a low molecular weight component having a molecular weight of up to about 300.

41. The product of claim 34 wherein component (iii) comprises a compound which is difunctional in the isocyanate-polyaddition reaction and contains lateral, hydrophilic ethylene oxide units.

42. The product of claim 34 wherein component (iii) comprises a compound which is monofunctional in the isocyanate-polyaddition reaction and contains terminal, hydrophilic ethylene oxide units.

43. The product of claim 34 wherein component (iii) corresponds to the formula

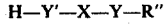

wherein
R" represents a monovalent hydrocarbon radical having from 1 to 12 carbon atoms;
X represents the radical obtained by removal of the terminal oxygen atom from a polyalkylene oxide chain having from about 5 to 90 chain members of which at least about 40% comprises ethylene oxide units and the remainder comprises other alkylene oxide units;
Y represents oxygen or —NR'"—;
Y' represents oxygen, —NH— or —NR'"—; and
R'" has the same definition as R".

44. The product of claim 43 wherein
R" represents an unsubstituted alkyl radical having from 1 to 4 carbon atoms;
X represents the radical obtained by removal of the terminal oxygen atom from a polyalkylene oxide chain having from about 20 to 70 chain members of which at least about 65% comprises ethylene oxide units and the remainder comprises other alkylene oxide units selected from the group consisting of propylene oxide, butylene oxide, styrene oxide and mixtures thereof; and Y and Y' represent oxygen.

45. The product of claim 44 wherein said other alkylene oxide units are propylene oxide units.

46. The product of claim 45 wherein component (iii) is present in an amount from 0.8 to 10% based on the weight of the prepolymer.

47. The process of claim 34 wherein component (iv) comprises compounds which are monofunctional in the isocyanate-polyaddition reaction and contain ionic group(s) or potential ionic group(s).

48. The product of claim 34 wherein component (iv) comprises compounds which are difunctional in the isocyanate-polyaddition reaction and contain ionic group(s) or potential ionic group(s).

49. The product of claim 34 wherein the ionic groups of component (iv) comprise a member selected from the group consisting of —COO$^\ominus$, —SO$_3^\ominus$, (

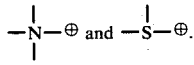

50. The product of claim 34 wherein the ionic groups are introduced into the prepolymer by sulfonic acid-containing diols which may be neutralized to form the ionic groups either before, during or after formation of the prepolymer.

51. The product of claim 34 wherein the ionic groups are introduced into the prepolymer by tertiary nitrogen-containing diols which may be neutralized to form the ionic groups either before, during or after formation of the prepolymer.

52. The product of claim 34 wherein the ionic groups are introduced into the prepolymer by hydroxycarboxylic acids of the formula (HO)$_x$Q(COOH)$_y$ wherein
Q represents a straight or branched hydrocarbon radical containing 1 to 12 carbon atoms, and
x and y represent values from 1 to 3,
said acids being neutralized to form the ionic groups either before, during or after formation of the prepolymer.

53. The product of claim 34 wherein the ionic groups are introduced into the prepolymer by dihydroxy alkanoic acids of the formula

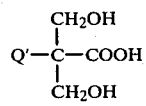

wherein Q' represents hydrogen or an alkyl group containing 1 to 8 carbon atoms,
said acids being neutralized to form the ionic groups either before, during or after formation of the prepolymer.

54. The product of claim 53 wherein Q' represents methyl.

55. The product of claim 34 wherein said polyfunctional amine comprises a member selected from the group consisting of ethylene diamine, bis-(4-aminocyclohexyl)-methane, bis-(4-amino-3-methyl-cyclohexyl)-methane, 1,6-diaminohexane, 1-amino-3-amino-methyl-3,5,5-trimethylcyclohexane, diethylene triamine, triethylene tetramine, tetraethylene pentamine, pentamethylene hexamine, and mixtures thereof.

56. The product of claim 34 wherein the ratio of the terminal isocyanate groups of the prepolymer to the amino hydrogens of the polyfunctional amine is between about 1.0:6.8 and 1.0:0.98 on an equivalent basis.

57. The product of claim 34 wherein the average functionality of the polyfunctional amine is between about 2.2 and 4.0.

58. A stable, colloidal, aqueous dispersion of cross-linked urea-urethanes which is prepared by
(a) forming a substantially linear, isocyanate-terminated prepolymer having a molecular weight of up to about 25,000 from the reaction product of
(i) an organic diisocyanate which contains aliphatically or cycloaliphatically bound isocyanate groups,
(ii) an organic dihydroxy compound with a molecular weight from about 300 to 6,000 comprising a member selected from the group consisting of polyesters, polyethers and polycarbonates,
(iii) an organic compound which is monofunctional or difunctional in the context of the isocyanate-polyaddition reaction and contains lateral or terminal, hydrophilic ethylene oxide units, and optionally,
(iv) an organic compound comprising a member selected from the group consisting of sulfonic acid-containing diols, tertiary nitrogen-containing diols and hydroxy-carboxylic acids of the formula (HO)$_x$Q(COOH)$_y$ wherein
Q represents a straight or branched hydrocarbon radical containing 1 to 12 carbon atoms, and
x and y represent values from 1 to 3,
wherein components (i), (ii), (iii) and (iv) are reacted in the presence of excess isocyanate groups and are chosen to provide a ratio of isocyanate groups to isocyanate-reactive groups of about 1.2 to 2.0 on an equivalent basis; component (iii) is present in an amount sufficient to provide about 0.35 to 10% by weight, based on the weight of prepolymer, of lateral and/or terminal, hydrophilic ethylene oxide units; and component (iv) is treated with a neutralizing agent either before, during or after formation of said prepolymer in an amount sufficient to provide about 0 to 120 milliequivalents of ionic groups per 100 grams of said prepolymer, the amount of component (iii) and the neutalized portion of component (iv) being present in an amount sufficient to provide a stable, aqueous dispersion of the prepolymer;
(b) forming a dispersion of said prepolymer in water and; subsequently,
(c) chain-extending said prepolymer to form said cross-linked urea-urethane with a polyfunctional amine comprising a member selected from the group consisting of ethylene diamine, 1-amino-3-aminomethyl-3,5,5-trimethylcyclohexane, diethylene triamine, triethylene tetramine, and mixtures thereof, wherein said polyfunctional amine has an average functionality (number of amine nitrogens per molecule) between about 2.2 and 4.0 and wherein the ratio of the terminal isocyanate groups of the prepolymer to the amino hydrogens of the polyfunctional amines is between 1.0:0.6 and 1.0:1.1.

59. The product of claim 58 wherein component (iv) comprises a dihydroxy alkanoic acid of the formula

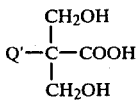

wherein Q' represents hydrogen or an alkyl group containing 1 to 8 carbon atoms.

60. The product of claim 59 wherein component (iv) is neutralized with a sufficient amount of a tertiary amine either before, during or after formation of the prepolymer to provide about 10 to 60 milliequivalents of ionic groups per 100 of prepolymer.

61. The product of claim 60 wherein said tertiary amine is triethylamine.

62. The product of claim 58 wherein said organic diisocyanate comprises a member selected from the group consisting of bis-(4-isocyanatocyclohexyl)-methane and 1-isocyanato-3-isocyanatomethyl-3,5,5-trimethylcyclohexane.

63. A stable, colloidal, aqueous dispersion of cross-linked urea-urethanes which is prepared by
   (a) forming a substantially linear, isocyanate-terminated prepolymer having a molecular weight between about 600 and 12,000 from the reaction product of
      (i) an organic diisocyanate comprising a member selected from the group consisting of bis-(4-isocyanatocyclohexyl)-methane and 1-isocyanato-3-isocyanatomethyl-3,5,5-trimethyl-cyclohexane,
      (ii) an organic dihydroxy compound with a molecular weight from about 300 to 3,000 comprising a member selected from the group consisting of polyesters, polyethers and polycarbonates,
      (iii) an organic compound which is monofunctional or difunctional in the context of the isocyanate-polyaddition reaction and contains lateral or terminal, hydrophilic ethylene oxide units, and
      (iv) a dihydroxy alkanoic acid of the formula

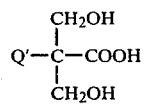

wherein Q' represents hydrogen or an alkyl group containing 1 to 8 carbon atoms, and
   wherein components (i), (ii), (iii) and (iv) are reacted in the presence of excess isocyanate groups and are chosen to provide a ratio of isocyanate groups to isocyanate-reactive groups of about 1.2 to 2.0 on an equivalent basis; component (iii) is present in an amount sufficient to provide about 0.35 to 10% by weight, based on the weight of the prepolymer, of lateral and/or terminal, hydrophilic ethylene oxide units; and component (iv) is neutralized with a tertiary amine either before, during or after formation of said prepolymer in an amount sufficient to provide about 10 to 60 milliequivalents of ionic group per 100 grams of prepolymer, the amount of component (iii) and the neutralized amount of component (iv) being present in an amount sufficient to provide a stable, aqueous dispersion of the prepolymer;
   (b) forming a dispersion of said prepolymer in water; and subsequently,
   (c) chain extending said prepolymer to form said cross-linked urea-urethane with a polyfunctional amine comprising a member selected from the group consisting of ethylene diamine, bis-(4-aminocyclohexyl)-methane, 1-amino-3-aminomethyl-3,5,5-trimethylcyclohexane, diethylene triamine, triethylene tetramine, and mixtures thereof, wherein said polyfunctional amine has an average functionality (number of amine nitrogens per molecule) between about 2.2 and 4.0 and wherein the ratio of the terminal isocyanate groups of the prepolymer to the amino hydrogens of the polyfunctional amine is between about 1.0:0.8 and 1.0:0.98.

64. The product of claim 63 wherein Q' represents methyl.

65. The product of claim 63 wherein said tertiary amine comprises triethylamine.

66. A coating on a substrate prepared from the product of claim 34, 59 or 63.

67. A film prepared from the product of claim 34, 59 or 63.

68. An adhesive prepared from the product of claim 34, 59 or 63.

69. The product of claim 1, wherein component (i) comprises bis-(4-isocyanatocyclohexyl)-methane.

* * * * *

UNITED STATES PATENT AND TRADEMARK OFFICE
CERTIFICATE OF CORRECTION

PATENT NO. : 4,408,008
DATED : October 4, 1983
INVENTOR(S) : Peter Markusch

It is certified that error appears in the above—identified patent and that said Letters Patent is hereby corrected as shown below:

Column 2, line 30, please delete "dispersion" and insert --dispersions--;

Column 12, line 19, please correct "1.0:06" to read --1.0:0.6--;

Column 26, line 5, (Claim 16, line 3) delete the formula and insert -- $-COO^{\ominus}$, $-SO_3^{\ominus}$, --;

Column 31, line 4, (Claim 46, line 1) please correct Claim 46 so that it depends on Claim 42;

Column 31, line 17, (Claim 49, line 3) after "$-SO_3^{\ominus}$," delete "(";

Column 34, line 51, (Claim 69, line 1) please correct Claim 69 so that it depends on Claim 34, 58 or 63.

Signed and Sealed this

Twenty-sixth Day of March 1985

[SEAL]

Attest:

DONALD J. QUIGG

Attesting Officer     Acting Commissioner of Patents and Trademarks